US012527684B2

(12) United States Patent
Spainhower et al.

(10) Patent No.: US 12,527,684 B2
(45) Date of Patent: Jan. 20, 2026

(54) MANDIBULAR ADVANCEMENT DEVICE

(71) Applicant: SmartGuard Rx, Inc., Layton, UT (US)

(72) Inventors: David L. Spainhower, Huntsville, UT (US); Brian Larsen, Phoenix, AZ (US)

(73) Assignee: SmartGuard Rx, Inc., Layton, UT (US)

( * ) Notice: Subject to any disclaimer, the term of this patent is extended or adjusted under 35 U.S.C. 154(b) by 619 days.

(21) Appl. No.: 16/669,428

(22) Filed: Oct. 30, 2019

(65) Prior Publication Data
US 2021/0128344 A1 May 6, 2021

(51) Int. Cl.
A61F 5/56 (2006.01)
A61C 11/00 (2006.01)
C08F 218/08 (2006.01)

(52) U.S. Cl.
CPC ............ *A61F 5/566* (2013.01); *A61C 11/003* (2013.01); *C08F 218/08* (2013.01)

(58) Field of Classification Search
CPC ...... A61F 5/56; A61F 5/566; A61F 2005/563; A61F 5/05891; A61C 11/001; A61C 11/003; A61C 11/006; A61C 11/02; A61C 11/08; A61C 7/36; A61C 7/00; Y10S 602/902; A63B 71/085
See application file for complete search history.

(56) References Cited

U.S. PATENT DOCUMENTS

| | | | |
|---|---|---|---|
| 4,568,280 A * | 2/1986 | Ahlin | A61F 5/566 433/6 |
| 5,823,193 A * | 10/1998 | Singer | A61F 5/566 128/848 |
| 5,868,138 A | 2/1999 | Halstrom | |
| D554,259 S | 10/2007 | Diacopoulos et al. | |
| D554,260 S | 10/2007 | Diacopoulos et al. | |
| D609,347 S | 2/2010 | Farrell | |
| D862,703 S | 10/2019 | Chen | |
| 2010/0319709 A1 | 12/2010 | Gonçalves | |
| 2013/0220341 A1* | 8/2013 | Scheffel | A61C 19/04 29/428 |
| 2014/0020691 A1* | 1/2014 | Sweeney | A61F 5/566 128/848 |
| 2015/0034093 A1* | 2/2015 | Kruger | A61F 5/566 128/848 |
| 2015/0101615 A1* | 4/2015 | Podmore | A61F 5/566 128/848 |
| 2017/0360595 A1* | 12/2017 | Smith | A61F 5/566 |
| 2018/0140385 A1* | 5/2018 | Jasper | A61C 7/36 |
| 2019/0388191 A1* | 12/2019 | Vincent | A61C 7/36 |
| 2020/0197214 A1* | 6/2020 | Frantz | A61F 5/566 |
| 2022/0110782 A1 | 4/2022 | Rodrigues et al. | |

* cited by examiner

*Primary Examiner* — Alireza Nia
*Assistant Examiner* — Gina McCarthy
(74) *Attorney, Agent, or Firm* — DENTONS Durham Jones Pinegar

(57) ABSTRACT

A mandibular advancement device is described, and may include an upper portion for fitting to maxillary teeth and a lower portion for fitting to mandibular teeth. The system may include one or more connecting bars, which may be provided in varying lengths, that allow the upper portion and lower portion to be pivotably connected such that horizontal and vertical articulation are possible. A kit is also described, which may allow a user to mold the device to their teeth and select from a plurality of connecting bars having different lengths.

15 Claims, 4 Drawing Sheets

MANDIBULAR ADVANCEMENT DEVICE

TECHNICAL FIELD

The present disclosure relates generally to a mandibular advancement device, which may be used to reduce or prevent snoring, and may be referred to as a "snore guard." More specifically, the present disclosure relates to a mandibular advancement device which can be custom-fitted to a user and allows vertical and horizontal articulation in use.

RELATED ART

Chronic snoring affects a considerable proportion of the population. During sleep, a person who snores experiences muscular relaxation in the throat, causing narrowing of the pharynx. This narrowing increases air velocity inspired by a Venturi-type effect. The air excites the supple part of the soft palate and the uvula, causing them to vibrate—commonly referred to as "snoring." The noise created by snoring can reach up to 90 decibels. In some cases, the narrowing is such that breathing may be suspended for about 10 seconds or more, causing sleep apnea.

There are many devices to prevent snoring. One is an intra-oral orthosis that advances the lower jaw. Advancement of the lower jaw enlarges the pharyngeal space. By counteracting the pharyngeal narrowing caused by muscular relaxation, air may be inspired at a normal speed, significantly reducing or eliminating vibration of the soft parts of the soft palate and the uvula, or snoring, along with the noise generated by such vibration.

Jaw-advancing devices have some drawbacks. For example, jaw-advancing devices typically place an undistributed pressure on the lingual mandibular teeth. This undistributed pressure often causes jaw soreness. Often, existing jaw-advancing devices require multiple trips to a dental professional for molding, fitting, etc. If the device is damaged or lost, multiple trips may be again required for replacement.

SUMMARY

A mandibular advancement device according to this disclosure may have a configuration that enables it to be custom fit, assembled, and/or adjusted by an individual, without the need for a dental or medical professional.

In various embodiments a mandibular advancement device according to this disclosure may include an upper shell, an upper moldable element, a lower shell, a lower moldable element, and at least one pair of connecting bars. The upper shell may include an upper receptacle that can carry the upper moldable element. A pair of upper coupling elements may be accessible from an outer periphery of the upper shell, for example, from a posterior portion of the outer periphery of the upper shell. Each upper coupling element may comprise a so-called "female" coupling element. The lower shell may include a lower receptacle that can carry the lower moldable element. A pair of lower coupling elements may be accessible from an outer periphery of the lower shell, for example, from an anterior portion of the outer periphery of the lower shell. Each lower coupling element may comprise a female coupling element.

Each moldable element may be custom molded, or formed, to the shapes and arrangements of a particular user's teeth. The material of each moldable element may facilitate molding by an individual, such as the user of the mandibular advancement device, without requiring assistance from a dental or medical professional. Each moldable element may be integral with its corresponding upper or lower shell, permanently secured within the receptacle of its corresponding upper or lower shell, or removable from its corresponding upper or lower shell.

Each connecting bar may include an exterior side and an interior side, with a coupling element located at or adjacent to each end of the connecting bar and accessible from the interior side thereof. The coupling elements of a connecting bar may be complementary to and, thus, couple with, an upper coupling element on a side of the upper shell and a lower coupling element on the same side of the lower shell. Each coupling element of a connecting bar may comprise a so-called "male" coupling element. The connecting bars of a pair may have the same lengths as one another.

The connecting bars, the coupling elements of the connecting bars, and/or the coupling elements of the upper and lower shells of the mandibular advancement device may have configurations that place the maxillary and mandibular jaws in desired positions relative to each other. Additionally, configurations of the connecting bars, the coupling elements of the connecting bars, and/or the coupling elements of the upper and lower shells may allow for some movement (e.g., side-to-side movement, anterior-posterior movement, etc.) of the jaws relative to one another, which may make the mandibular advancement device comfortable to use.

In some embodiments, a mandibular advancement device according to this disclosure may be part of a system that includes pairs of connecting bars having different (e.g., progressively longer, etc.) lengths to enable selection and adjustment of the relative anterior-posterior locations of the upper shell and the lower shell. Such a system may also include one or more replacement parts (e.g., an upper shell, an upper moldable element, a lower shell, a lower moldable element, extra connecting bars, etc.).

In another aspect, methods for preventing snoring are disclosed. Such a method may include molding an upper moldable element of a mandibular advancement device to a user's maxillary teeth and molding a lower element of the mandibular advancement device to the user's mandibular teeth. In addition, a pair of connecting bars with lengths that will place the upper moldable element and the lower moldable element in desired anterior-posterior positions relative to one another may be selected, and then used to secure an upper shell that carries the upper moldable element and a lower shell that carries the lower moldable element to each other. In some embodiments, the relative anterior-posterior positions of the upper moldable element and the lower moldable element may be modified by removing one pair of connecting bars and replacing it with another pair of longer or shorter connecting bars.

Other aspects of the disclosed subject matter, as well as features and advantages of various aspects of the disclosed subject matter, should be apparent to those of ordinary skill in the art through consideration of the ensuing description, the accompanying drawings, and the appended claims.

BRIEF DESCRIPTION OF DRAWINGS

The following drawings illustrate what are currently considered to be specific representative configurations for carrying out the disclosed subject matter and are not limiting as to embodiments which may be made in accordance with this disclosure. The components in the drawings are not necessarily to scale relative to each other. Like reference numerals designate corresponding parts throughout the several views.

DETAILED DESCRIPTION

Figure 1:
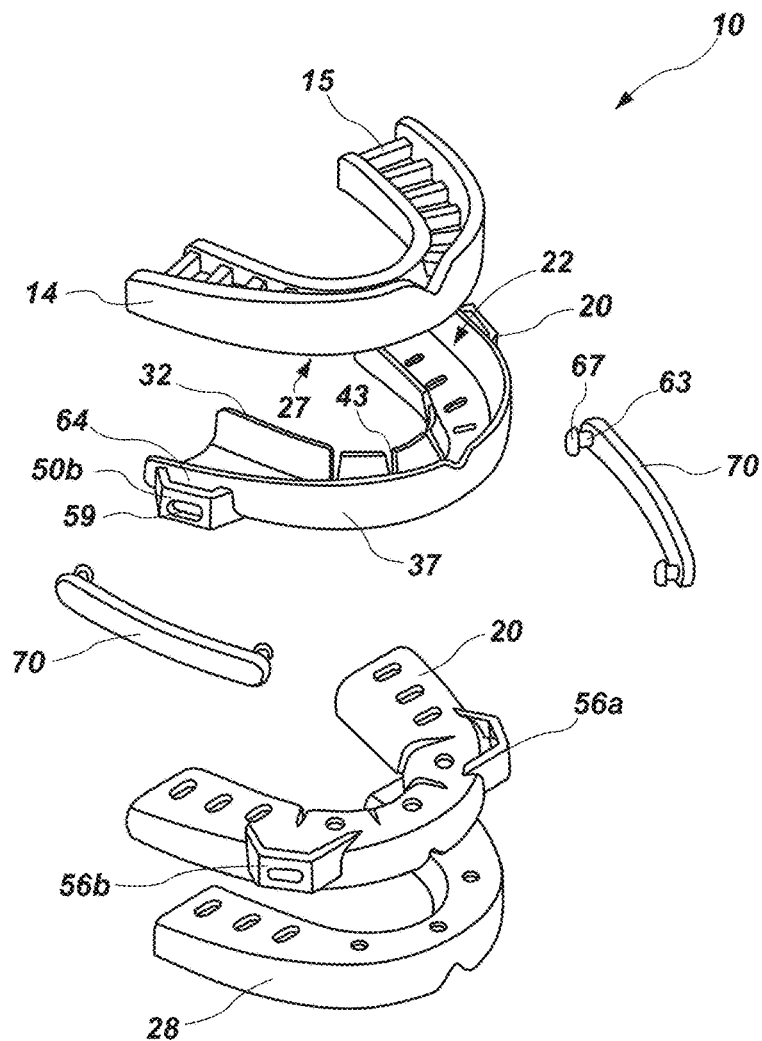
FIG. 1 is an exploded view of a mandibular advancement device as described herein.
Figure 2:
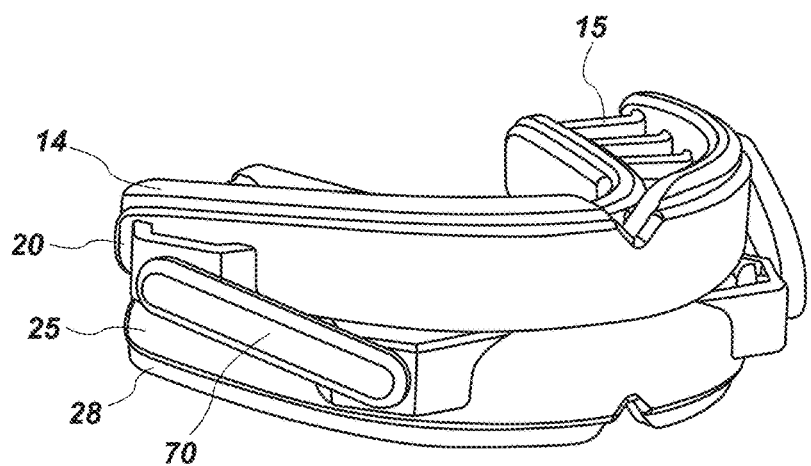
FIG. 2 is a front perspective view of the mandibular advancement device of FIG. 1.

Hereinafter, exemplary embodiments of the present disclosure will be described in detail with reference to the accompanying drawings. Advantages and features of the present disclosure and methods accomplishing them will become apparent from the following description of exemplary embodiments with reference to the accompanying drawings.

It will be appreciated that various aspects discussed in reference to one drawing may be present and/or used in conjunction with the embodiment shown in another drawing, and each element shown in multiple drawings may be discussed only once.

Reference in the specification to "one configuration," "one embodiment," "a configuration," or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the disclosed subject matter may be combined in any suitable manner in one or more configurations. In the following description, numerous specific details are provided, such as examples of products or manufacturing techniques that may be used, to provide a thorough understanding of configurations of the disclosed subject matter. One of ordinary skill in the relevant art will recognize, however, that configurations of the disclosed subject matter may be practiced without one or more of the specific details, or with other methods, components, materials, and so forth. In other instances, well-known structures, materials, or operations are not shown or described in detail to avoid obscuring aspects of the invention.

It should also be noted that, as used in this specification and the appended claims, singular forms such as "a," "an," and "the" may include the plural unless the context clearly dictates otherwise. Thus, for example, reference to "a shell" may include one or more of such shells, and reference to "the interconnecting bars" may include reference to one or more of such interconnecting bars.

As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

As used herein, the term "outer perimeter" refers to the portion of the system that faces the vestibule of the mouth, or the inner cheeks of the user when the user's mouth is closed. As used herein, the term "inner perimeter" refers to portions of the system that face the user's oral cavity proper, or lingual side of the user's teeth. As used herein, "teeth" refers to natural teeth, implants, dentures, bridges, partial dentures, etc.

This disclosure generally relates to an intraoral mandibular advancement device that reduces snoring during sleep. One particular embodiment of the present disclosure is shown and described in a mandibular advancement device of FIG. 1. FIG. 1 is an exploded view of one configuration of a mandibular advancement device 10. The mandibular advancement device 10 may generally include an upper shell 20 with an upper receptacle 22, an upper moldable element 14 within the upper receptacle 22 of the upper shell 20, a lower shell 25 with a lower receptacle 27, and a lower moldable element 28 carried by the lower receptacle 27 of the lower shell 25. The upper shell 20 and the lower shell 25 may be more simply referred to as "shell 20" and "shell 25" or as "shells 20 and 25." The upper moldable element 14 and the lower moldable element 28 may be more simply referred to as "moldable element 14" and "moldable element 28" or as "moldable elements 14 and 28."

The upper moldable element 14 that may be carried by the upper shell 20 may receive a plurality of maxillary teeth, while the lower moldable element 28 that may be carried by the lower shell 25 may receive a plurality of mandibular teeth. The moldable elements 14 and 28 may comprise any suitable moldable material. In one embodiment, the moldable material may be an ethylene vinyl acetate (EVA) copolymer, such as those available from Dow as ELVAX® 250 and ELVAX® 150.

Figure 3:
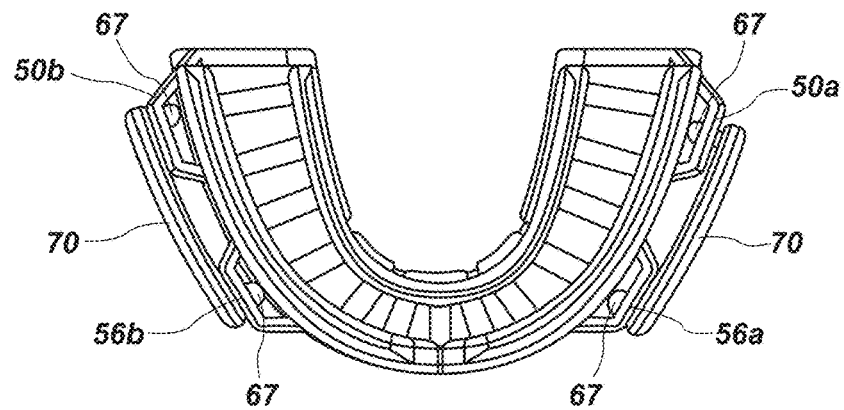
FIG. 3 is a top view of the mandibular advancement device of FIG. 1.

As seen in FIG. 3, in some embodiments, the moldable elements 14 and 28 may include ribs 15 and 30, respectively, with the ribs 15 of the upper moldable element 14 in the upper shell 20 being visible in the top view of FIG. 3. One or both of the moldable elements 14 and 28 may lack ribs. The ribs 15, 30, if any, of the moldable elements 14 and 28 may impart the moldable elements 14 and 28 with some structure that may enable the moldable elements 14 and 28 to be forced against and form securely to any of a wide variety of tooth morphologies.

One or both of the upper moldable element 14 and the lower moldable element 28 may be provided to a consumer separately from its respective upper shell 20 and lower shell 25. Alternatively, one or both of the moldable elements 14 and 28 may be provided within the receptacle 22, 27 of its respective shell 20, 25, but removable from its respective shell 20, 25. One or both of the moldable elements 14 and 28 may be frictionally fitted within the receptacle 22, 27 of its respective shell 20, 25. Alternatively, one or both of the moldable elements 14 and 28 may be permanently attached to its respective shell 20, 25 (e.g., by a friction fit, with a suitable adhesive, etc.). As another alternative, one or both of the moldable elements 14 and 28 may be formed integrally with its respective shell 20, 25. In the embodiment shown in FIG. 1, the upper shell 20 and the lower shell 25 may comprise injection molded thermoplastic (e.g., polypropylene, high impact polystyrene, etc.) trays that have been over-molded with a thermoforming resin (e.g., an EVA copolymer, etc.).

According to another aspect, each moldable element 14 and 28 may be suitable for custom fitting by an individual (e.g., a user, a family member of the user, a caretaker for the user, etc.) without visiting a dental or medical professional. Of course, the moldable elements 14 and 28 may also be custom fit to a user's mouth by a dental or medical professional. As an example of a molding technique, the individual may custom fit the upper moldable element 14 by heating the upper moldable element 14 to a suitable temperature (e.g., about 100° C., etc.) and then placing the upper moldable element 14 into the mouth of the user, against the user's maxillary teeth for custom molding the upper moldable element 14 to the user's maxillary teeth. Similarly, the individual may heat the lower moldable element 28 to a suitable temperature (e.g., about 100° C., etc.) and place the lower moldable element 28 into the user's mouth against the user's mandibular teeth for custom molding the lower moldable element 28 to the user's mandibular teeth. This type of process is often referred to as a "boil and bite" method. Other types of custom molding techniques may also be used.

Custom molding may be conducted with one or both of the moldable elements 14 and 28 separate from their respective shell 20, 25. After the moldable elements 14 and 28 have been formed, or fitted, to the user's teeth, they may be placed in their respective shell 20, 25. Alternatively, custom molding may occur with one or both of the moldable elements 14 and 28 within their respective shells 20 and 25.

Each of the upper shell 20 and the lower shell 25 may include a base 21, 26, respectively. Each base 21, 26 may include an interior surface, which faces the moldable element 14, 28 and, thus, the user's teeth. An inner perimeter 32, 35 protrudes from the interior surface of the base 21, 26 at a rear edge of the base 21, 26. An outer perimeter 37, 40 protrudes from the interior surface of the base 21, 26 at a front edge of the base 21, 26. Thus, the inner perimeter 32, 35 and the outer perimeter 37, 40 may be oriented somewhat parallel to one another.

Figure 4:
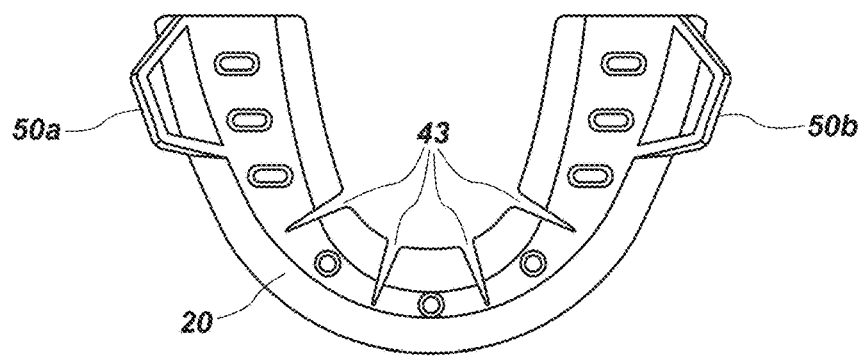
FIG. 4 is a bottom view of an upper shell of a mandibular advancement device as described herein.
Figure 5:
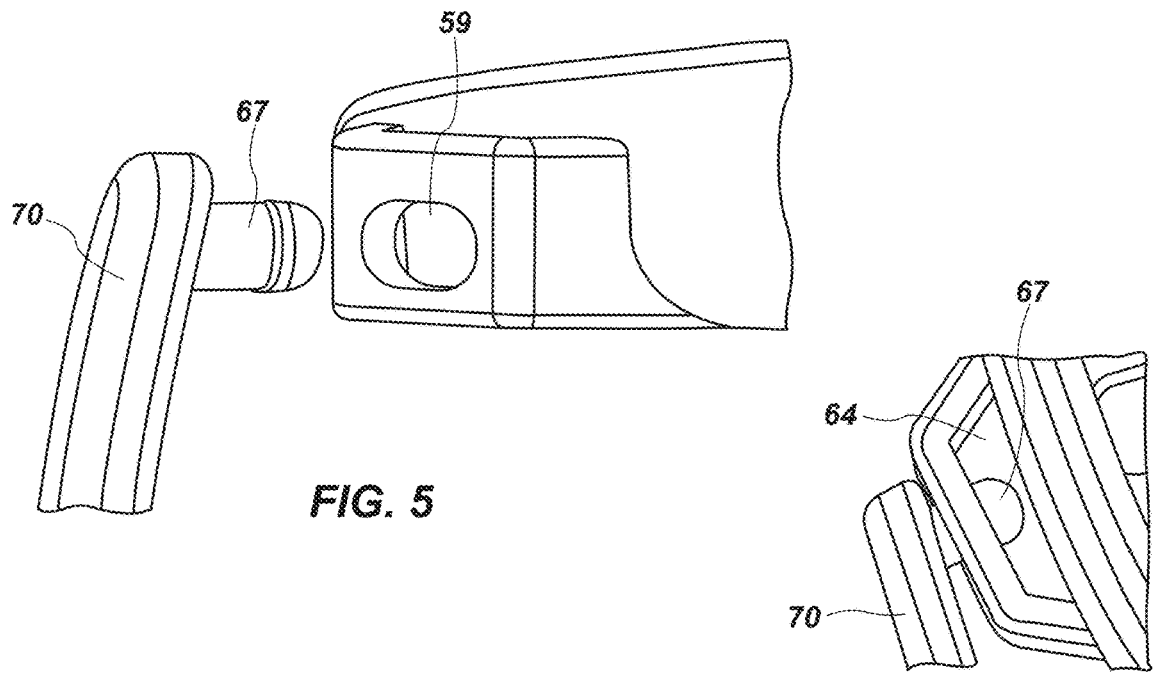
FIG. 5 is a front, partial view of an upper shell, including an upper shell bracket, and a connecting bar proximal to the upper shell bracket.

The inner perimeter 32, 35 of each shell 20, 25 may include one or more notches 43, 47 extending along the height of the anterior lingual portion (i.e., at the front) of the inner perimeter 32, 35 and, optionally, partially into the base 21, 26 of its respective shell 20, 25. Each notch 43, 47 may enable the shell 20, 25 to flex and/or bend to accommodate various arch shapes defined by the maxillary teeth and the mandibular teeth, respectively, as well as accommodate changes to the arcuate shapes of the upper moldable element 14 and/or the lower moldable element 28 as they are custom fit to an individual's teeth. FIG. 4 shows a bottom view of the upper shell 20 with notches 43 formed in the anterior lingual portion of the inner perimeter 32 and base 21 of the upper shell 20.

As seen in FIG. 1, the upper shell 20 may include a pair of upper coupling elements on opposite sides of its outer perimeter 37. Each upper coupling element may comprise a so-called "female" coupling element. In a specific embodiment, each female coupling element may include an upper bracket 50a, 50b. Similarly, as seen in FIG. 1, the lower shell 25 may include a pair of lower coupling elements on opposite sides of its outer perimeter 40. Each lower coupling element may comprise a female coupling element. In a specific embodiment, a first lower bracket 56a may be provided on a first side of the outer perimeter 40 of the lower shell 25 and a second lower bracket 56b may be provided on a second side of the outer perimeter 40 of the lower shell 25. In some embodiments, such as the specific, but non-limiting embodiment depicted by FIG. 1, the upper brackets 50a and 50b may be located posteriorly, while the lower brackets 56a and 56b may be located anteriorly. In other embodiments, the anterior-to-posterior positions of the brackets 50a and 50b, 56a and 56b may differ from the positions shown in the drawings; they may even be reversed, with the upper brackets 50a and 50b located more anteriorly and the lower brackets 56a and 56b located more posteriorly.

The upper brackets 50a and 50b may be integral with (e.g., molded as a part of, etc.) the outer perimeter 37 of the upper shell 20. Similarly, the lower brackets 56a and 56b may be integral with the outer perimeter 40 of the lower shell 25. In other embodiments, the upper brackets 50a and 50b may be assembled with and coupled to the outer perimeter 37 of the upper shell 20 and/or the lower brackets 56a and 56b may be assembled with and coupled to the outer perimeter 40 of the lower shell 25.

The upper brackets 50a and 50b may extend outwardly from the outer perimeter 37 of the upper shell 20. Each upper bracket 50a, 50b may comprise a slot 59, which may open to a pocket 64 defined between the upper bracket 50a, 50b and the outer perimeter 37. Each lower bracket 56a, 56b may extend outwardly from the outer perimeter 40 of the lower shell 25, with the pocket 64 defined between the lower bracket 56a, 56b and the outer perimeter 40. A slot 59 through each lower bracket 56a, 56b may open to the pocket 64. As depicted, each slot 59 may be somewhat elongated and oriented laterally, although the upper brackets 50a and 50b and/or the lower brackets 56a and 56b may include slots 59 with other shapes and/or orientations.

The upper shell 20 and the lower shell 25 of the mandibular advancement device 10 may be pivotably and/or slidably connected to one another by way of one or more connecting bars 70. Each connecting bar 70 may comprise an elongated element that includes a first end and a second end. Each of the first end and the second end may include a coupling element. The coupling elements of each connecting bar 70 may comprise so-called "male" coupling elements. In a specific embodiment, each male coupling element may include a projection 63 that extends laterally from an interior side of the connecting bar 70, with each projection 63 being located at or adjacent to an end of the connecting bar 70. An enlarged structure, such as a knob 67, may be located at an end of each projection 63.

Each connecting bar 70 may be rigid enough to secure the upper shell 20 and the lower shell 25 in position relative to each other, but have some flexibility to accommodate some movement of a user's mandible as the user falls asleep and/or sleeps. Each connecting bar 70 may be formed from any of a variety of different materials. In some embodiments, the connecting bars 70 may be molded from a thermoplastic polymer, such as polypropylene or a high impact polystyrene.

The slot 59 of each bracket 50a, 50b, 56a, 56b may have dimensions that enable it to receive the knob 67. The knob 67 of the connecting bar 70 may be inserted into, pressed through, and/or snap-fit through the slot 59 of the bracket 50a, 50b, 56a, 56b, and into the pocket 64, with the projection 63 residing within the slot 59. The slot 59 may retain the projection 63 of the connecting bar 70 in a manner that allows the connecting bar 70 to be pivotably and/or slidably attached to the bracket 50a, 50b, 56a, 56b. In some embodiments, a length of the slot 59 may exceed a height of the slot 59, or the slot 59 may be oblong. The knob 67 of the connecting bar 70 may also be oblong (e.g., oval shaped, rectangular, etc.) with a shape and dimensions that enable the knob 67 to be oriented in a manner that allows it to be readily inserted into the slot 59 (e.g., perpendicular to the upper shell 20 or lower shell 25, and then the connecting bar 70 may be rotated with respect to the upper shell 20 or the lower shell 25 (e.g., such that it is more parallel with respect to the upper shell 20 or the lower shell 25, etc). By rotating the connecting bar 70 in such a way, the slot 59 may hold the knob 67 within the pocket 64, as the length of the knob 67, which is somewhat vertically oriented, is larger than the height of the slot 59. The connection between the connecting bar 70 and the bracket 50a, 50b, 56a, 56b may accommodate both vertical and horizontal articulation.

Figure 6:
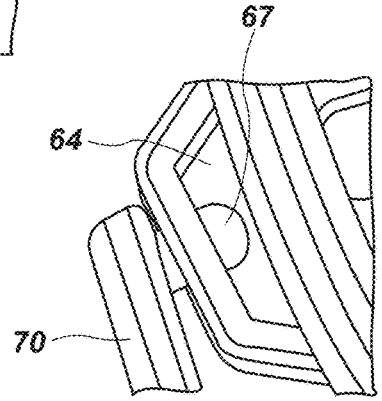
FIG. 6 is a top, partial view of the upper shell of FIG. 5 with the connecting bar in place within the upper shell bracket.
Figure 7:
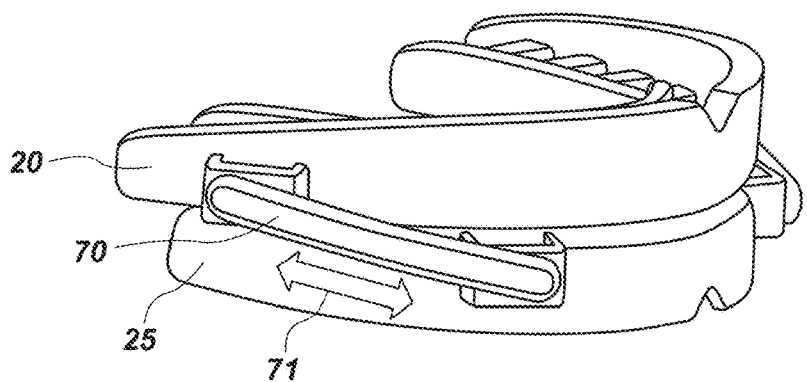
FIG. 7 is a side perspective view of a mandibular advancement device.
Figure 8:
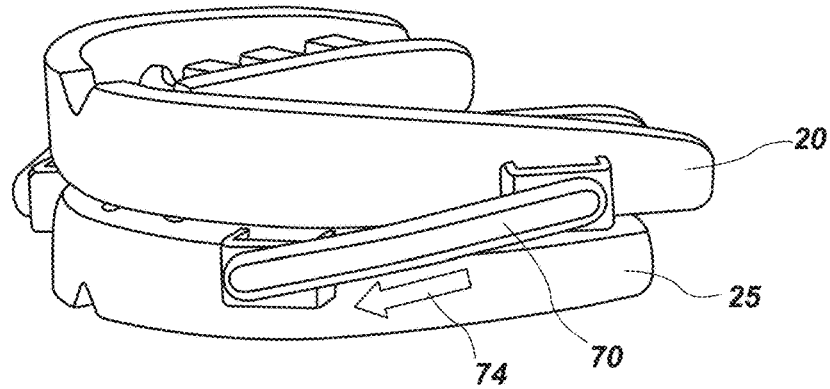
FIG. 8 is a front perspective view of a first side of a mandibular advancement device.
Figure 9:
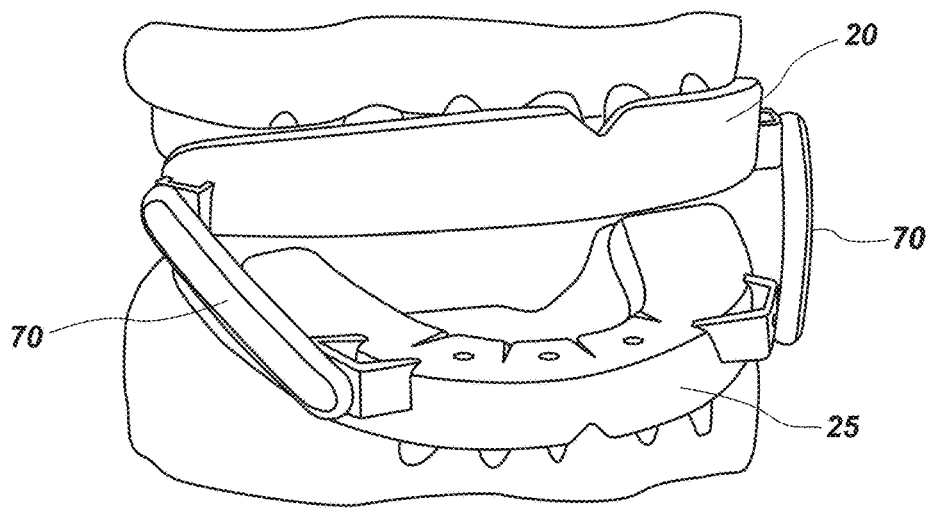
FIG. 9 is a front perspective view of a second side of a mandibular advancement device, as deployed in a user's mouth.

FIG. 6 shows a top, partial view of bracket 50b with a connecting bar 70 in place, the knob 67 within the pocket 64, and the projection 63 within the slot 59. The projection 63 may rotate within the slot 59 such that the upper shell 20 and the lower shell 25 may move vertically with respect to each other, or toward and away from each other. The projection 63 may move laterally within the slot 59 to enable limited horizontal movement of the upper shell 20 and the lower shell 25 relative to one another. FIGS. 7-9 show how the upper shell 20 and the lower shell 25 may move horizontally with respect to each other (such as by the projection 63 sliding within the slot 59, as indicated by arrow 71 in FIG. 7 and arrow 74 in FIG. 8), as well as vertically with respect to each other. FIG. 9 shows the upper shell 20 and the lower shell 25 in place on the teeth of an artificial mouth, with the artificial mouth open.

According to another aspect of the present disclosure, the component parts of a mandibular advancement device 10 may be replaceable. For example, stress on certain components may cause uneven wear over time or even failure of one or more of the components. In some embodiments, one or more of the moldable elements 14 and 28, the upper shell 20, the lower shell 25, and/or the connecting bars 70 may be replaced without the need to replace the entire mandibular advancement device 10.

Figure 10:
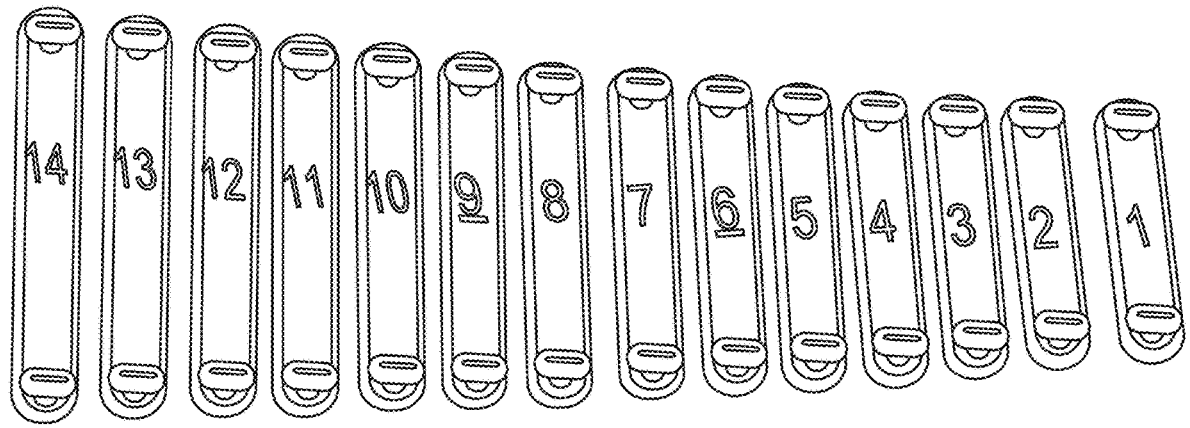
FIG. 10 shows a plurality of connecting bars for use with a mandibular advancement device, such as that depicted by FIGS. 1-9.
Figure 11:
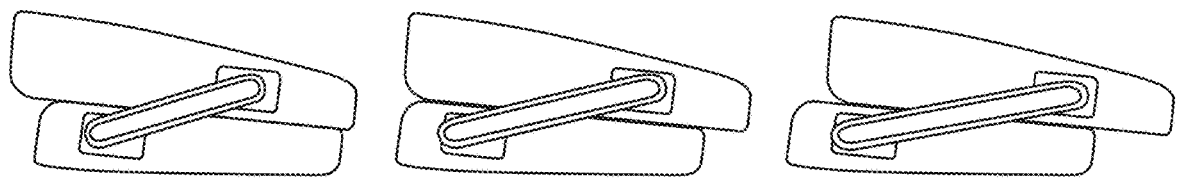
FIG. 11 is a side view showing a plurality of mandibular advancement devices using different lengths of connecting bars to provide mandibular advancements of different distances.

According to another aspect, the present disclosure may relate to a system or kit provided for a user to customize a mandibular advancement device 10 for their personal comfort and use. For example, the kit may include an upper shell 20 and a lower shell 25, along with boil-and-bite moldable elements 14 and 28. The kit may also include a plurality of connecting bars 70. The connecting bars 70 may be provided in varying lengths. For example, connecting bars 70 having lengths from about 15 millimeters to about 30 millimeters may be provided. The lengths of the connecting bars 70 may be provided, for example, in 1 millimeter increments (e.g., from 16 mm to 29 mm, etc.). As shown in FIG. 10, the plurality of connecting bars 70 may be numbered sequentially to allow a user to easily select a connecting bar 70 that has a length that will position the upper shell 20 and the lower shell 25 anteriorly-posteriorly in a manner that will prevent a particular user from snoring; for example, at positions compatible with a centric occlusion of the user. FIG. 11 shows the mandibular advancement device 10 in use with connecting bars 70 of various lengths.

A user may select a connecting bar 70 that positions the lower shell 25 at a location that forces their mandibular teeth and, thus, their mandible forward to a location that is more anteriorly located than the position of their mandible in their natural bite at rest. Because a user may select from different lengths of connecting bars 70, they may be able to slowly adjust the pressure of the lower shell 25 as the user grows accustomed to using the mandibular advancement device 10. Because the mandibular adjustment device 10 may enable the user to articulate their jaws horizontally and/or vertically, the pressure on the anterior maxillary teeth and the lingual mandibular teeth may be evenly distributed, which may reduce soreness in the user's teeth and/or jaws.

According to another aspect, a method for fitting a mandibular advancement device 10 may include selecting an upper shell 20, selecting a lower shell 25, molding the upper moldable element 14 to a user's maxillary teeth, and molding the lower moldable element 28 to the user's mandibular teeth. In embodiments where the moldable elements 14 and 28 are provided separately from or have been separated from their respective upper shell 20 and lower shell 25, the user may then place the upper moldable element 14 in the upper receptacle 22 of the upper shell 20 and place the lower moldable element 28 in the lower receptacle 27 of the lower shell 25. A user may select a pair of connecting bars 70 with a length that is compatible with the centric occlusion of the user. The user may insert the knob 67 at the first end of the connecting bar 70 through the slot 59 of a bracket 50a, 50b, 56a, 56b of one of the upper shell 20 and the lower shell 25. As an example, the knob 67 may be aligned with the slot 59, introduced through the slot 59 into the pocket 64 behind the bracket 50a, 50b, 56a, 56b, and the connecting bar 70 and, thus, the knob 67 may then be rotated to secure the knob 67 within the pocket 64 and the connecting bar 70 in place relative to the bracket 50a, 50b, 56a, 56b. This process may be repeated to connect the opposite end of the connecting bar 70 to the corresponding bracket 56a, 56b, 50a, 50b of the other of the lower shell 25 and the upper shell 20. The user can replace the connecting bar 70 with a longer or shorter connecting bar 70, as needed, to reposition the upper shell 20 and the lower shell 25 relative to one another.

The various embodiments described above, including elements of the various embodiments described above, can be combined to provide further embodiments. Various portions and components of apparatus within the scope of this disclosure, including for example, structural components, can be formed by one or more various suitable manufacturing processes known to those in the art. Similarly, various portions and components of apparatuses within the scope of this disclosure can be made from suitable materials known to those in the art.

The above description has set out various features, functions, methods and other aspects of the disclosure. Time and further development may change the manner in which the various aspects are implemented.

The scope of protection defined by the claims is not intended to be limited to the specific sizes, shapes, features or other aspects of the disclosed embodiments. The claimed inventions may be implemented or embodied in other forms while still being within the scopes of the concepts disclosed hereby. Also included are equivalents of the elements of the claims that can be made without departing from the scopes of concepts properly protected by the claims that follow.

What is claimed:

1. A mandibular advancement device, comprising:
   an upper moldable element moldable to a user's maxillary teeth;
   an upper shell with a receptacle that receives the upper moldable element, the upper shell comprising a first upper bracket on a posterior location of a first outer perimeter side of the upper shell and a second upper bracket on a posterior location of a second outer perimeter side of the upper shell, each of the first upper bracket and the second upper bracket comprising an elongated slot and a pocket;
   a lower moldable element moldable to a user's mandibular teeth;
   a lower shell with a receptacle that receives the lower moldable element, the lower shell comprising a first lower bracket on an anterior location of a first outer perimeter side of the lower shell and a second lower bracket on an anterior location of a second outer perimeter side of the lower shell, each of the first lower bracket and the second lower bracket comprising an elongated slot and a pocket; and
   a first connecting bar and a second connecting bar, each of the first connecting bar and the second connecting bar comprising a first end and a second end, the first end and the second end of each of the first connecting bar and the second connecting bar including:
      a projection receivable within the elongated slot, rotatable within the elongated slot, and slidable along a length of the elongated slot of the first upper bracket, the second upper bracket, the first lower bracket, and/or the second lower bracket; and
      a knob receivable within the pocket of the first upper bracket, the second upper bracket, the first lower bracket, and/or the second lower bracket.

2. The mandibular advancement device of claim 1, comprising a plurality of first connecting bars and a plurality of second connecting bars, the plurality of first connecting bars including first connecting bars of a plurality of different lengths, the plurality of second connecting bars including second connecting bars of the plurality of different lengths.

3. The mandibular advancement device of claim 2, wherein the plurality of different lengths enables each first connecting bar and its corresponding second connecting bar to define a different anterior-posterior position of the upper shell and the lower shell from at least another first connecting bar of the plurality of first connecting bars and its corresponding at least another second connecting bar of the plurality of second connecting bars.

4. The mandibular advancement device of claim 2, wherein each connecting bar of the plurality of first and second connecting bars has a length of about 15 millimeters to about 30 millimeters.

5. The mandibular advancement device of claim 1, wherein the knobs and the elongated slots have oblong shapes.

6. The mandibular advancement device of claim 5, wherein the knobs can be snap-fitted into the elongated slots.

7. The mandibular advancement device of claim 1, wherein the upper moldable element comprises a material that softens when heated to enable the upper moldable element to be molded to the user's maxillary teeth.

8. The mandibular advancement device of claim 1, wherein the upper moldable element comprises an ethylene vinyl acetate copolymer.

9. The mandibular advancement device of claim 1, wherein the upper moldable element is removably receivable within the receptacle of the upper shell.

10. The mandibular advancement device of claim 1, wherein the lower moldable element comprises a material that softens when heated to enable the lower moldable element to be molded to the user's mandibular teeth.

11. The mandibular advancement device of claim 1, wherein the lower moldable element comprises an ethylene vinyl acetate copolymer.

12. The mandibular advancement device of claim 1, wherein the lower moldable element is removably receivable within the receptacle of the lower shell.

13. The mandibular advancement device of claim 1, wherein at least one of the upper moldable element and the lower moldable element comprises ribs.

14. A method performed by a user of fitting a mandibular advancement device to the user's mouth, comprising:
   molding an upper moldable element to a user's maxillary teeth;
   molding a lower moldable element to a user's mandibular teeth;
   selecting a pair of connecting bars from a plurality of pairs of pre-made connecting bars of various lengths;
   inserting a first knob at a first end of each connecting bar into a slot and a pocket of a bracket of an upper shell carrying the upper moldable element, the pocket being defined by the bracket and the upper shell; and
   inserting a second knob at a second end of each connecting bar into a slot and a pocket of a bracket of a lower shell carrying the lower moldable element, the pocket being defined by the bracket and the lower shell, each connecting bar and slot capable of accommodating slight anterior-posterior movement of the mandible.

15. The method of claim 14, wherein selecting the pair of connecting bars comprises selecting the pair of connecting bars to have a length that will place the upper shell and the lower shell at desired anterior-posterior positions relative to one another.

* * * * *